(12) United States Patent
Achtner

(10) Patent No.: US 7,889,429 B2
(45) Date of Patent: Feb. 15, 2011

(54) OPTICAL OCULAR SYSTEM

(75) Inventor: Bertram Achtner, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 12/593,227

(22) PCT Filed: Mar. 28, 2008

(86) PCT No.: PCT/EP2008/002487

§ 371 (c)(1),
(2), (4) Date: Dec. 9, 2009

(87) PCT Pub. No.: WO2008/119512

PCT Pub. Date: Oct. 9, 2008

(65) Prior Publication Data

US 2010/0128346 A1 May 27, 2010

(30) Foreign Application Priority Data

Mar. 29, 2007 (DE) .................... 10 2007 015 278

(51) Int. Cl.
*G02B 27/14* (2006.01)
*G02B 17/00* (2006.01)
(52) U.S. Cl. .................... 359/630; 359/735
(58) Field of Classification Search ............. 359/630, 359/735, 736
See application file for complete search history.

(56) References Cited

U.S. PATENT DOCUMENTS 4,923,282 A    5/1990   Spitzberg
5,095,326 A    3/1992   Nozaki et al.
5,587,836 A    12/1996  Takahashi et al.
5,793,339 A    8/1998   Takahashi
5,959,780 A    9/1999   Togino et al.
6,097,542 A    8/2000   Takahashi et al.
6,181,475 B1   1/2001   Togino et al.
6,333,820 B1   12/2001  Hayakawa et al.
6,903,875 B2   6/2005   Achtner
6,985,301 B2   1/2006   Mihara
6,995,922 B2   2/2006   Mihara et al.
2001/0048561 A1 * 12/2001 Heacock ................ 359/631
2004/0252382 A1 12/2004 Nagata
2005/0052756 A1 3/2005   Tamura et al.
2005/0057820 A1 3/2005   Nishioka et al.

FOREIGN PATENT DOCUMENTS

DE   10 2004 020 818 A1   11/2005
EP            1 513 000 A1   3/2005
JP              2004-151552   5/2004
JP              2004-264585   9/2004

* cited by examiner

*Primary Examiner*—William C Choi
(74) *Attorney, Agent, or Firm*—Patterson Thuente Christensen Pedersen, P.A.

(57) ABSTRACT

The present invention relates to an optical ocular system having imaging optics that map an image generated in an object plane such that a user can perceive the same in an image plane, wherein the imaging optics comprise a first lens having negative refractive power, and a deflection element having positive refractive power, which is connected downstream of the first lens, effecting a folding of the optical path by means of a single reflection, wherein the first lens and the object plane form a first optical group, and a displacement unit is provided, which can change the distance between the first optical group and the displacement element for the correction of spherical ametropia of the user.

18 Claims, 2 Drawing Sheets

OPTICAL OCULAR SYSTEM

PRIORITY CLAIM

The present application is a National Phase entry of PCT Application No. PCT/EP2008/002487, filed Mar. 28, 2008, which claims priority from German Application Number 102007015278.9-51, filed Mar. 29, 2007, the disclosures of which are hereby incorporated by reference herein in their entirety.

BACKGROUND OF THE INVENTION

The present invention relates to an optical ocular system having an imaging optic, which images an image generated in an object plane so that a user can perceive it in an image plane, the imaging optic comprising a first lens having negative refractive power and a deflection element downstream from the first lens having positive refractive power, which causes folding of the beam path using a single reflection.

Such an optical ocular system is described in, for example, EP 1 513 000 A1. The ocular system is used therein in an HMD device (head-mounted display device). However, the ocular system cited at the beginning can also be used in microscopes or telescopes.

It is disadvantageous that when using an HMD device, for example, the user, if he must wear spectacles because of spherical defective vision, also has to wear these spectacles when using the HMD device. Wearing the spectacles and wearing the HMD device in addition is frequently viewed as unpleasant, however. It is also difficult to place the HMD device in its intended form on the head when the user is still wearing spectacles.

SUMMARY OF THE INVENTION

Proceeding therefrom, it is the object of the invention to improve an optical ocular system of the type cited at the beginning so that it is better suitable for users having spherical defective vision.

The object of the invention is achieved in an optical ocular system of the type cited at the beginning in that the first lens and the object plane form a first optic group and a displacement unit is provided, which can change the spacing between the first optic group and the deflection element to correct spherical defective vision of the user. The user having spherical defective vision can thus use the optical ocular system without his spectacles, because the adaptation to the spherical defective vision can be realized using the displacement unit. It is particularly advantageous in this case that a spacing within the imaging optic is changed for this purpose, so that the user does not have to move himself relative to the optical ocular system, in order to be able to perceive the image sharply.

The displacement unit can be implemented so that it can displace the first optic group along the optical axis of the imaging optic. In particular, it can provide a displacement path of ±2 mm. A diopter range of ±3.5 can thus be covered. Displacement-related imaging errors are minimized by the displacement along the optical axis.

The spacing between the first lens and the object plane in an example embodiment is fixed and/or constant during the displacement of the first optic group. I.e., the optic group as a whole is displaced.

Both the boundary surface of the first lens facing toward the deflection element and also the boundary surface of the deflection element facing toward the first lens may each be curved convexly. Spatially, this is a very favorable variant, because no difficulties arise in regard to the mountings of first lens and deflection element, because the least spacing occurs between the vertices on the optical axis between both boundary surfaces. There is thus sufficient space for the mountings.

The deflection element is particularly implemented in one piece. No complex adjustment is thus necessary. In particular, the entry and exit faces of the deflection element have different curvatures. The face on which the reflection occurs is preferably implemented as a planar face (i.e., having an infinitely large curvature).

Of course, the deflection element can also be implemented in multiple pieces. In this case, it can be a 90° prism having a planar deflection face and a planar entry side and a planar exit side, for example. A planoconvex lens is attached on its planar side on each of the exit and entry sides. The planoconvex lenses may be cemented with, glued with, or joined by optical contact bonding to the prism, for example. Any other type of connection is also possible.

The two boundary surfaces of the first lens and the entry and exit faces of the deflection element may be curved aspherically, the aspheric faces being rotationally symmetric and centered on the optical axis of the imaging optic.

The boundary surface of the deflection element facing toward the first lens may be implemented as a diffractive surface. Color errors may thus be corrected outstandingly.

The deflection element can cause the folding of the beam path by 70°-110°. A deflection of 90° is preferred.

The ocular system can have an image element for generating the image in the object plane. For this purpose, the image element itself can be situated in the object plane. It is also possible, however, that imaging of the image element is performed in the object plane.

A self-illuminating or a non-self-illuminating display element can be provided as the image element. In particular, the display element can have a plurality of pixels controllable independently of one another, which may particularly be situated in lines and columns. The image element can be an LCD module, an LCoS module, or also an adjustable mirror matrix.

The first lens and the image element may be held in a single mounting. It is thus easily possible to keep the spacing between image element and lens constant.

Furthermore, the first lens and the image element may be connected to one another in a form-fit manner. This is possible using a corresponding mounting, for example.

The imaging optic and the image element form an eye module. Such an eye module can be provided twice, so that one eye module is provided for each eye of the user. Binocular embodiments may thus be implemented.

In particular, the spacing between the optic group and the deflection element can be changeable independently of one another in both eye modules. It is thus possible to compensate for different spherical visual defects of the two eyes of the user.

In the ocular system, the beam path in the eye module from the image plane up to the exit pupil of imaging optic can be essentially L-shaped, the eye modules being situated so that the spacing of the two optic groups is less than the spacing of the two deflection elements. However, it is also possible that the eye modules are situated so that the spacing of the two optic groups is greater than the spacing of the two deflection elements.

A vignetting mask, shutter or stop can be provided between the image element and the first lens. This stop functions to suppress or block undesired scattered light. The vignetting stop can particularly have a contour adapted to the contour of an imaging area of the image element. Thus, for example, it can have a rectangular transmissive area, if the imaging area is also rectangular. In particular, the transmissive area in the stop is somewhat larger than the imaging area of the imaging element.

Furthermore, a display device having an optical ocular system according to the invention (or a corresponding refinement) is provided, which also has a mounting module to be worn on the head, the imaging optic being fastened on the mounting module and the image imaged using the imaging optic being perceptible by a user wearing the display device.

Furthermore, the image element can be fastened on the mounting module.

The mounting module can be implemented as a spectacle-type framework, beanie, cap, strap, or in another way.

The ocular system according to the invention (including its refinements) can also be used in a microscope and a telescope, so that a corresponding microscope or telescope is provided.

It is understood that the above-mentioned features and the features to be explained hereafter are usable not only in the disclosed combinations, but rather also in other combinations or alone, without leaving the scope of the present invention.

BRIEF DESCRIPTION OF THE DRAWINGS

The invention is explained in greater detail hereafter for exemplary purposes with reference to the drawings, which also disclose features essential to the invention. In the figures.

DETAILED DESCRIPTION

Figure 1:
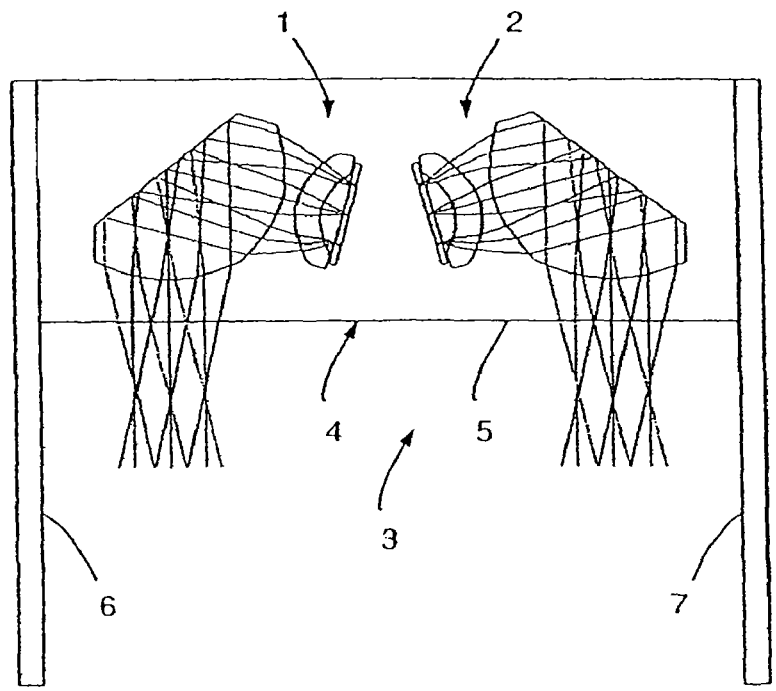
FIG. 1 shows a schematic top view of a display device having optical ocular system.

FIG. 1 shows an embodiment of the optical ocular system 1, 2 according to the invention, in which it is used in a binocular display device 3 to be worn on the head of a user.

The display device 3, which can also be referred to as an HMD device (head-mounted display device), comprises a mounting module 4, which is schematically shown in FIG. 1 and comprises a housing 5 accommodating the two optical ocular systems 1, 2 and two lateral earpieces 6 and 7. The mounting module 4 is thus implemented like spectacle frames, which the user can put on in the same way as spectacles.

As may be inferred from FIG. 1, the display device 3 contains a separate optical ocular system 1, 2 in each case for the right and left eyes of the user, which are implemented identically except for their configuration in the mounting module 4. Therefore, only the optical ocular system 1 for the left eye of the user is described in detail in the following description.

Figure 2:
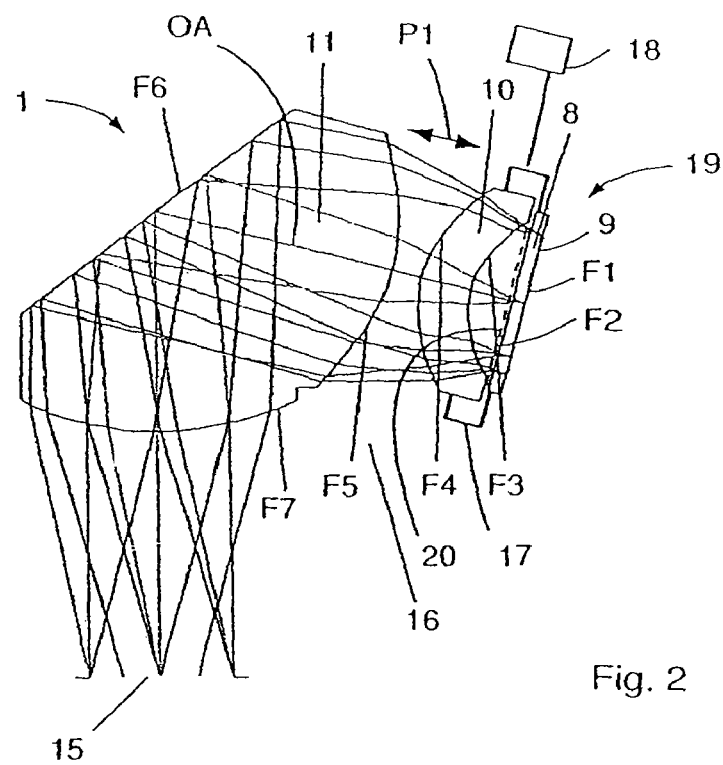
FIG. 2 shows a schematic enlarged view of the ocular system 1 from FIG. 1.

The optical ocular system 1 is shown enlarged in FIG. 2. As may be inferred from FIG. 2, it comprises an image-generating element 8, which generates an image to be shown in an object plane 9. This is achieved here in that the image-generating area of the element 8 lies in the object plane 9. The image-generating element can be a self-illuminating or a non-self-illuminating display. For example, it can be implemented as an LCD module, an LCoS module, or as an tilting mirror matrix.

A concave-convex lens 10 is downstream from the image-generating element 8, which is positively connected to the image-generating element 8. This is implemented in the example described here by a common mounting 17, which is only schematically shown in FIG. 2.

The lens 10 is a deflection element 11 having a curved entry face F5, a planar deflection face F6, and a curved exit face F7 downstream. The exit pupil of the optical ocular system 1 is identified by the reference numeral 15.

In operation, the image generated using the image-generating element 8 is imaged via the lens 10, which has negative refractive power, and the deflection element or deflection prism 11, which has positive refractive power, in the exit pupil 15 as a virtual image, so that a user wearing the display device 3 can perceive the imaged image. The lens 10 forms an imaging optic 16 together with the deflection element 11.

In order to be able to adapt the display device 3 to spherical defective vision of the user, a displacement unit 18 (which is only shown in FIG. 2) is provided, which can displace the image-generating element 8 and the lens 10, which together form a first optic group 19, along the optical axis OA of the imaging optic 16 by ±2 mm, as indicated by the double arrow P1. Defective vision in the range of ±3.5 diopter can thus be corrected.

In the ocular system described here, the exit pupil 15 is 14 mm from the lens vertex of the exit face F7 and has a size of 6 mm×10 mm. The diagonal of the image shown is shown at a field of vision angle of at least 30° and the deflection by the planar deflection face F6 is preferably in the range of 70°-110°. The lens 10 and the deflection element 11 are preferably each formed from an optical plastic, so that the weight of the ocular system 1 is low.

Figure 3:
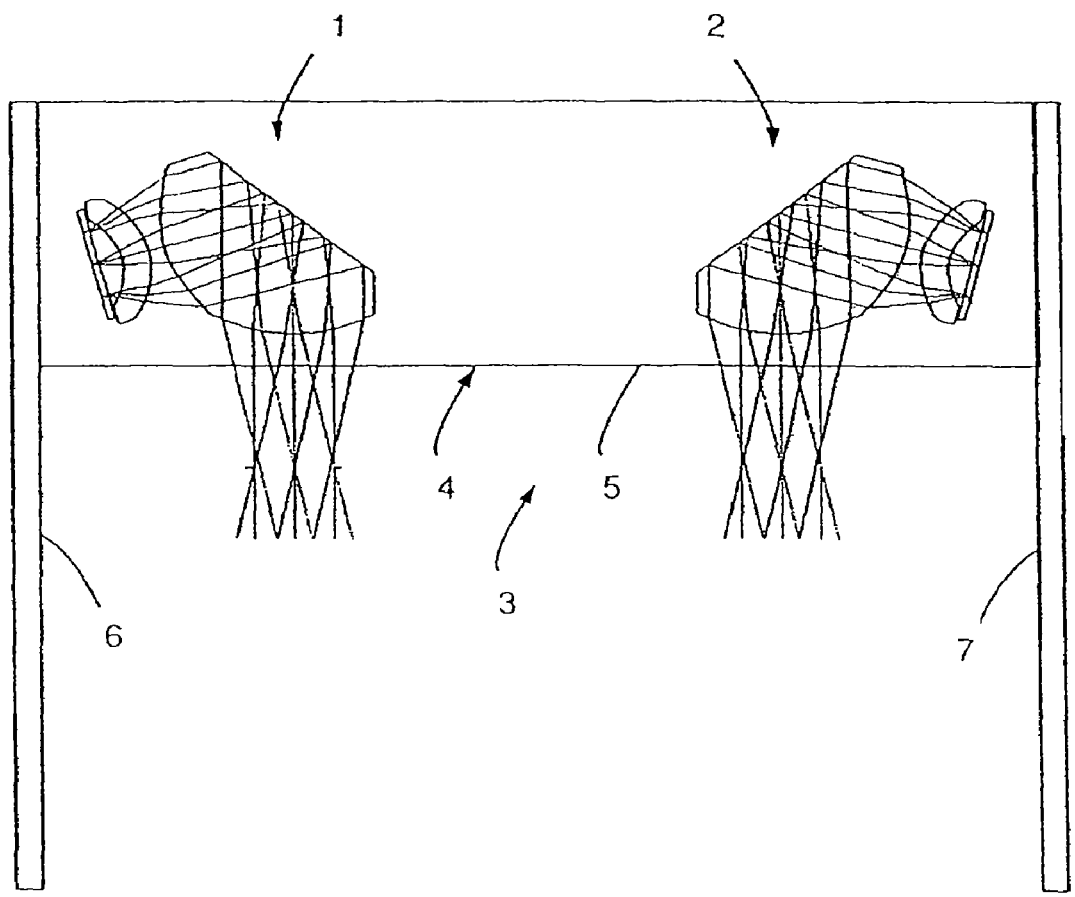
FIG. 3 shows a further embodiment of a display device having optical ocular systems.

A stop 20 can be provided between the image-generating element 8 and the lens 10. The stop 20 is only shown in FIG. 3 (as a dashed line) and preferably has a transmissive area (e.g., a recess) having the same contour as the imaging area of the image-generating element 8. The transmissive area can be somewhat larger than the imaging area, in order to suppress undesired scattered light. In the example described here, the imaging area of the element 8 has a rectangular shape, so that the transmissive area of the shading stop 20 is also implemented as rectangular.

The entry and exit faces F5, F7 and the two boundary faces F3, F4 of the lens 10 are aspherical, rotationally-symmetric faces, which are centered to the optical axis OA of the imaging optic 16. The material of the lens 10 is different from the material of the deflection element 11, the material of the deflection element 11 having a lower dispersion than the material of the lens 10.

In order to ensure outstanding color correction, the entry face F5 is additionally also implemented as a diffractive face. The implementation of the entry face F5 as a diffractive face provides the advantage that it is a face inside the imaging optic 16, so that it can easily be protected from dirtying.

The diffractive face F5 has a kinoform profile. In detail, the diffractive face F5 comprises concentric rings having the lens vertex of the entry face F5 as the center point. Each ring has an inner radius and an outer radius. The inner radius of the first ring is zero. The outer radius of the mth ring is the inner radius of the m+1th ring. The width of the rings becomes continuously smaller from the middle to the edge of the lens. The groove depth on the inner radius is zero, and it is d on the outer radius. Upon the transition from the mth ring to the m+1th ring, a step of the height d is thus provided. The diffractive face can be described using the following phase profile function $\phi$:

$$\varphi = \frac{2\pi}{\lambda_0} \sum_n C_n r^{2n}$$

In this equation, $\lambda_0$ stands for the reference wavelength and $C_n$ are the coefficients of the phase polynomial. The radius r of the mth ring is calculated from $$m\lambda_0 = \sum_n C_n r^{2n}$$

$$m = 1, 2, 3, \ldots$$

There are at most N rings, with $$N = \frac{1}{\lambda_0} \sum_n C_n r_{max}^{2n}$$

In this equation, $r_{max}$ stands for half of the lens diameter. The groove depth d on each ring is $$d = \frac{\lambda_0}{n_0 - 1}$$

with $n_0$ being the index of refraction of the material for $\lambda_0$. In the embodiment described here, it has been shown that it was sufficient to describe the diffractive face using the coefficient $C_1$. This is specified in following Table 3.

The aspheric faces are described using the following formula (arrow height formula)

$$z(h) = \frac{\rho h^2}{1 + \sqrt{1 - (1+K)\rho^2 h^2}} + Ah^4 + Bh^6 + Ch^8 + Dh^{10} + Eh^{12} + Fh^{14} + Gh^{16} + Hh^{18}$$

z arrow height

K eccentricity

ρ vertex curvature h height

A, B, C, ... H coefficients for higher-order terms

The precise optical construction of the imaging optic 16 can be inferred from following Tables 1 through 4, Table 1 describing the lens 10 and the deflection element 11. The aspheric faces are specified in greater detail in Table 2 and the diffractive face is specified in greater detail in Table 3. The materials used (see column "material" of the table) are characterized in Table 4. It is also specified in the column "face type" of Table 1 whether it is an aspheric and possibly a diffractive face.

TABLE 1

| Face | Face type | Radius [mm] | Spacing to the next face [mm] | Material |
|---|---|---|---|---|
| 9 | | Infinite | 0.000000 | |
| F1 | | Infinite | 0.900000 | NBK7_SCHOTT |
| F2 | | Infinite | 3.038000 | |
| F3 | Aspherical | −6.44595 | 3.800000 | PSTYR |
| F4 | Aspherical | −8.97318 | 2.100000 | |
| F5 | Aspherical, diffractive | 13.15788 | 17.500000 | 480R |
| F6 | | Infinite | 16.500000 | 480R |
| F7 | Aspherical | −20.71599 | 18.300000 | |
| 15 | | Infinite | | |

TABLE 2

| Face | K | A | B | C |
|---|---|---|---|---|
| F3 | 0.000000 | −0.110584E−02 | 0.261827E−03 | −0.134534E−04 |
| F4 | 0.000000 | 0.405943E−04 | 0.270194E−04 | −0.769285E−06 |
| F5 | 0.000000 | −0.682894E−04 | −0.180150E−05 | 0.168871E−07 |
| F7 | 0.000000 | 0.388888E−04 | −0.199410E−06 | 0.239487E−08 |

| | D | E | F | G | H |
|---|---|---|---|---|---|
| F3 | 0.336914E−06 | −0.289232E−08 | −0.224721E−10 | 0.669441E−13 | 0.892241E−14 |
| F4 | 0.771130E−08 | 0.682475E−11 | −0.384074E−12 | | |
| F5 | −0.744599E−10 | 0.475142E−13 | | | |
| F7 | −0.174143E−10 | 0.468155E−13 | | | |

TABLE 3

| Face | $C_1$ | $\lambda_0$ | Order of diffraction | N | $R_1$[mm] | $R_N$[mm] | d[mm] |
|---|---|---|---|---|---|---|---|
| F7 | −2.2919 × 10$^{−3}$ | 546.07 | 1 | 599 | 0.4881 | 11.9465 | 0.001 |

TABLE 4

| Material | Short name | $n_d$ | $v_d$ | ρ in g/cm³ |
|---|---|---|---|---|
| NBK7_SCHOTT | NBK7_SCHOTT | 1.51680 | 64.17 | 2.51 |
| PMMA | PMMA | 1.49178 | 57.99 | 1.19 |
| POLYSTYRENE | POLY | 1.59250 | 30.84 | 1.10 |
| POLYCARBONATE | PC | 1.58500 | 30.00 | 1.25 |
| TOPAZ | TOPAZ | 1.53320 | 56.72 | 1.02 |
| ZEONEX E48R | E48R | 1.52996 | 56.24 | 1.01 |
| ZEONEX 330R | 330R | 1.50904 | 52.80 | 1.01 |
| ZEONEX 480R | 480R | 1.52470 | 56.24 | 1.01 |

In Table 4, $n_d$ he is the index of refraction for 587.56 nm, $v_d$ is the corresponding Abbe number, and ρ is the density.

The focal width $f_1$ of the lens 10, the focal width $f_2$ of the deflection element 11, and the focal width f of the imaging optic 16 are specified in Table 5 for the example 1 described in connection with Tables 1-4 and the following examples 2-9 still to be described. In examples 1-6 and in example 9, f=19.7 mm, the diagonal field of vision is 32°. In example 7, f=21.0, and the diagonal field of vision is 30°. In example 8, f=25.4 and the diagonal field of vision is 25°.

TABLE 5

| | | Partial focal widths | |
|---|---|---|---|
| | Focal width f Imaging optic 16 | $f_1$ Lens 10 | $f_2$ Deflection element 11 |
| Example 1 | 19.7 | −106.0 | 22.5 |
| Example 2 | 19.7 | −101.7 | 22.5 |

TABLE 5-continued

| | | Partial focal widths | |
|---|---|---|---|
| | Focal width f Imaging optic 16 | $f_1$ Lens 10 | $f_2$ Deflection element 11 |
| Example 3 | 19.7 | −102.4 | 22.4 |
| Example 4 | 19.7 | −103.5 | 22.4 |
| Example 5 | 19.7 | −103.7 | 22.3 |
| Example 6 | 19.7 | −102.5 | 22.3 |
| Example 7 | 21.0 | −57.2 | 22.8 |
| Example 8 | 25.4 | −27.6 | 25.1 |
| Example 9 | 19.7 | −233.5 | 23.2 |

The focal width of the aspheric deflection element 11 varies only slightly and is in the range of the focal width of the imaging optic 16 made of deflection element 11 and lens 10. The focal width of the lens 10 varies little if only different materials are used, the index of refraction and dispersion differences of the materials for the lens 10 being slight. The focal width of the lens 10 varies very strongly if the focal width of the imaging optic 16 and thus the field to be imaged is varied.

For the focal widths f, $f_1$, and $f_2$, the following relationship applies:

$$0.9*f < f_1 < 1.5*f \text{ and } 1.0*f < |f_2| < 13.0*f$$

The optical data for eight further embodiments are specified hereafter in the same way as for the example already described, no diffractive face being provided in Example 9.

Example 2

| Face | Face type | Radius [mm] | Spacing to the next face [mm] | Material |
|---|---|---|---|---|
| 9 | | Infinite | 0.000000 | |
| F1 | | Infinite | 0.900000 | NBK7_SCHOTT |
| F2 | | Infinite | 3.123190 | |
| F3 | Aspherical | −6.31092 | 3.700000 | PCARB |
| F4 | Aspherical | −8.58638 | 2.100000 | |
| F5 | Aspherical, diffractive | 13.42140 | 17.500000 | 480R |
| F6 | | Infinite | 16.500000 | 480R |
| F7 | Aspherical | −20.70854 | 18.300000 | |
| 15 | | Infinite | | |

| Face | K | A | B | C | D |
|---|---|---|---|---|---|
| F3 | 0.000000 | −0.105810E−02 | 0.268979E−03 | −0.147703E−04 | 0.372695E−06 |
| F4 | 0.000000 | 0.548035E−04 | 0.260686E−04 | −0.771603E−06 | 0.783687E−08 |
| F5 | 0.000000 | −0.676831E−04 | −0.173704E−05 | 0.172058E−07 | 0.732592E−10 |
| F7 | 0.000000 | 0.362404E−04 | −0.186980E−06 | 0.260500E−08 | −0.167321E−10 |

| | E | F | G | H | J |
|---|---|---|---|---|---|
| F3 | −0.319554E−08 | −0.229890E−10 | 0.129444E−12 | 0.921098E−14 | 0.190547E−16 |
| F4 | 0.102057E−10 | −0.314121E−12 | | | |
| F5 | 0.533178E−13 | | | | |
| F7 | 0.404917E−13 | | | | |

| Face | $C_1$ | $\lambda_0$ | Order of diffraction | N | $R_1$[mm] | $R_N$[mm] | d[mm] |
|---|---|---|---|---|---|---|---|
| F7 | $-2.2224 \times 10^{-3}$ | 546.07 | 1 | 580 | 0.4957 | 11.9378 | 0.001 |

Example 3

| Face | Face type | Radius [mm] | Spacing to the next face [mm] | Material |
|---|---|---|---|---|
| 9 | | Infinite | 0.000000 | |
| F1 | | Infinite | 0.900000 | NBK7_SCHOTT |
| F2 | | Infinite | 3.120000 | |
| F3 | Aspherical | −6.37965 | 3.700000 | PSTYR |
| F4 | Aspherical | −8.66726 | 2.127559 | |
| F5 | Aspherical, diffractive | 13.43253 | 17.500000 | E48R |
| F6 | | Infinite | 16.500000 | E48R |
| F7 | Aspherical | −20.87079 | 18.300000 | |
| 15 | | Infinite | | |

| Face | K | A | B | C | D |
|---|---|---|---|---|---|
| F3 | 0.000000 | −0.105700E−02 | 0.270109E−03 | −0.148213E−04 | 0.371356E−06 |
| F4 | 0.000000 | 0.550271E−04 | 0.259918E−04 | −0.770428E−06 | 0.781146E−08 |
| F5 | 0.000000 | −0.674612E−04 | −0.173212E−05 | 0.172212E−07 | −0.732963E−10 |
| F7 | 0.000000 | 0.360549E−04 | −0.187285E−06 | 0.258817E−08 | −0.167328E−10 |

| | E | F | G | H | J |
|---|---|---|---|---|---|
| F3 | −0.316610E−08 | −0.226518E−10 | 0.162353E−12 | 0.908005E−14 | −0.198492E−16 |
| F4 | 0.969201E−11 | −0.314977E−12 | | | |
| F5 | 0.524624E−13 | | | | |
| F7 | 0.414271E−13 | | | | |

| Face | $C_1$ | $\lambda_0$ | Order of diffraction | N | $R_1$[mm] | $R_N$[mm] | d[mm] |
|---|---|---|---|---|---|---|---|
| F7 | $-2.2188 \times 10^{-3}$ | 546.07 | 1 | 579 | 0.4961 | 11.9374 | 0.001 |

Example 4

| Face | Face type | Radius [mm] | Spacing to the next face [mm] | Material |
|---|---|---|---|---|
| 9 | | Infinite | 0.000000 | |
| F1 | | Infinite | 0.900000 | NBK7_SCHOTT |
| F2 | | Infinite | 3.120000 | |
| F3 | Aspherical | −6.37840 | 3.700000 | PCARB |
| F4 | Aspherical | −8.65554 | 2.150248 | |
| F5 | Aspherical, diffractive | 13.42553 | 17.500000 | E48R |
| F6 | | Infinite | 16.500000 | E48R |
| F7 | Aspherical | −20.92638 | 18.300000 | |
| 15 | | Infinite | | |

| Face | K | A | B | C | D |
|---|---|---|---|---|---|
| F3 | 0.000000 | −0.102859E−02 | 0.268403E−03 | −0.148407E−04 | 0.371361E−06 |
| F4 | 0.000000 | 0.390289E−04 | 0.261050E−04 | −0.767730E−06 | 0.780055E−08 |
| F5 | 0.000000 | −0.675269E−04 | −0.173137E−05 | 0.172109E−07 | −0.731766E−10 |
| F7 | 0.000000 | 0.362318E−04 | −0.185754E−06 | 0.258608E−08 | −0.166517E−10 |

| | E | F | G | H | J |
|---|---|---|---|---|---|
| F3 | −0.317289E−08 | −0.221025E−10 | 0.169215E−12 | 0.874111E−14 | −0.150746E−16 |
| F4 | 0.918020E−11 | −0.317003E−12 | | | |
| F5 | 0.535132E−13 | | | | |
| F7 | 0.444178E−13 | | | | |

| Face | $C_1$ | $\lambda_0$ | Order of diffraction | N | $R_1$[mm] | $R_N$[mm] | d[mm] |
|---|---|---|---|---|---|---|---|
| F7 | $-2.1824 \times 10^{-3}$ | 546.07 | 1 | 570 | 0.5002 | 11.9424 | 0.001 |

Example 5

| Face | Face type | Radius [mm] | Spacing to the next face [mm] | Material |
|---|---|---|---|---|
| 9 | | Infinite | 0.000000 | |
| F1 | | Infinite | 0.900000 | NBK7_SCHOTT |
| F2 | | Infinite | 3.124979 | |
| F3 | Aspherical | −6.39073 | 3.700000 | PSTYR |
| F4 | Aspherical | −8.66860 | 2.100000 | |
| F5 | Aspherical, diffractive | 13.43194 | 17.500000 | TOPAZ |
| F6 | | Infinite | 16.500000 | TOPAZ |
| F7 | Aspherical | −21.01111 | 18.300000 | |
| 15 | | Infinite | | |

| Face | K | A | B | C | D |
|---|---|---|---|---|---|
| F3 | 0.000000 | −0.113039E−02 | 0.273295E−03 | −0.147757E−04 | 0.370988E−06 |
| F4 | 0.000000 | 0.734150E−04 | 0.258357E−04 | −0.771096E−06 | 0.781671E−08 |
| F5 | 0.000000 | −0.674430E−04 | −0.173202E−05 | 0.172200E−07 | −0.732795E−10 |
| F7 | 0.000000 | 0.360408E−04 | −0.187399E−06 | 0.258799E−08 | −0.167200E−10 |

| Face | E | F | G | H | J |
|---|---|---|---|---|---|
| F3 | −0.319593E−08 | −0.239540E−10 | 0.144448E−12 | 0.956120E−14 | 0.169992E−17 |
| F4 | 0.973764E−11 | −0.314155E−12 | | | |
| F5 | 0.524923E−13 | | | | |
| F7 | 0.413999E−13 | | | | |

| Face | $C_1$ | $\lambda_0$ | Order of diffraction | N | $R_1$[mm] | $R_N$[mm] | d[mm] |
|---|---|---|---|---|---|---|---|
| F7 | $-2.2154 \times 10^{-3}$ | 546.07 | 1 | 579 | 0.4965 | 11.9463 | 0.001 |

Example 6

| Face | Face type | Radius [mm] | Spacing to the next face [mm] | Material |
|---|---|---|---|---|
| 9 | | Infinite | 0.000000 | |
| F1 | | Infinite | 0.900000 | NBK7_SCHOTT |
| F2 | | Infinite | 3.129602 | |
| F3 | Aspherical | −6.32866 | 3.700000 | PCARB |
| F4 | Aspherical | −8.60206 | 2.100000 | |
| F5 | Aspherical, diffractive | 13.43205 | 17.500000 | TOPAZ |
| F6 | | Infinite | 16.500000 | TOPAZ |
| F7 | Aspherical | −21.00964 | 18.300000 | |
| 15 | | Infinite | | |

| Face | K | A | B | C | D |
|---|---|---|---|---|---|
| F3 | 0.000000 | −0.110810E−02 | 0.272724E−03 | −0.147855E−04 | 0.370907E−06 |
| F4 | 0.000000 | 0.718451E−04 | 0.258913E−04 | −0.770928E−06 | 0.781572E−08 |
| F5 | 0.000000 | −0.674595E−04 | −0.173228E−05 | 0.172177E−07 | −0.732712E−10 |
| F7 | 0.000000 | 0.360787E−04 | −0.186836E−06 | 0.258799E−08 | −0.167306E−10 |

| Face | E | F | G | H | J |
|---|---|---|---|---|---|
| F3 | −0.319437E−08 | −0.236943E−10 | 0.148886E−12 | 0.957053E−14 | 0.245264E−17 |
| F4 | 0.974128E−11 | −0.314425E−12 | | | |
| F5 | 0.524635E−13 | | | | |
| F7 | 0.412770E−13 | | | | |

| Face | $C_1$ | $\lambda_0$ | Order of diffraction | N | $R_1$[mm] | $R_N$[mm] | d[mm] |
|---|---|---|---|---|---|---|---|
| F7 | $-2.2182 \times 10^{-3}$ | 546.07 | 1 | 579 | 0.4962 | 11.9389 | 0.001 |

Example 7

| Face | Face type | Radius [mm] | Spacing to the next face [mm] | Material |
|---|---|---|---|---|
| 9 | | Infinite | 0.000000 | |
| F1 | | Infinite | 0.900000 | NBK7_SCHOTT |
| F2 | | Infinite | 3.524287 | |
| F3 | Aspherical | −6.21922 | 3.700000 | PSTYR |
| F4 | Aspherical | −9.29975 | 1.851370 | |
| F5 | Aspherical, diffractive | 14.11834 | 17.500000 | E48R |
| F6 | | Infinite | 16.500000 | E48R |
| F7 | Aspherical | −20.64291 | 18.300000 | |
| 15 | | Infinite | | |

| Face | K | A | B | C | D |
|---|---|---|---|---|---|
| F3 | 0.000000 | −0.203782E−02 | 0.285716E−03 | −0.139103E−04 | 0.363895E−06 |
| F4 | 0.000000 | −0.200704E−03 | 0.310975E−04 | −0.794131E−06 | 0.747524E−08 |
| F5 | 0.000000 | −0.833537E−04 | −0.160281E−05 | 0.174477E−07 | −0.766781E−10 |
| F7 | 0.000000 | 0.301837E−04 | −0.212268E−06 | 0.264276E−08 | −0.155875E−10 |

| Face | E | F | G | H | J |
|---|---|---|---|---|---|
| F3 | −0.344951E−08 | −0.287210E−10 | 0.213991E−12 | 0.866484E−14 | 0.787728E−16 |
| F4 | 0.801007E−11 | −0.346847E−12 | | | |
| F5 | 0.621673E−13 | | | | |
| F7 | 0.336162E−13 | | | | |

| Face | $C_1$ | $\lambda_0$ | Order of diffraction | N | $R_1$[mm] | $R_N$[mm] | d[mm] |
|---|---|---|---|---|---|---|---|
| F7 | −2.2507 × 10⁻³ | 546.07 | 1 | 588 | 0.4926 | 11.9440 | 0.001 |

Example 8

| Face | Face type | Radius [mm] | Spacing to the next face [mm] | Material |
|---|---|---|---|---|
| 9 | | Infinite | 0.000000 | |
| F1 | | Infinite | 0.900000 | NBK7_SCHOTT |
| F2 | | Infinite | 3.034584 | |
| F3 | Aspherical | −5.79408 | 3.700000 | PSTYR |
| F4 | Aspherical | −11.092 | 4.6047 | |
| F5 | Aspherical, diffractive | 18.48583 | 17.0 | E48R |
| F6 | | Infinite | 16.0 | E48R |
| F7 | Aspherical | −21.090 | 18.300000 | |
| 15 | | Infinite | | |

| Face | K | A | B | C | D |
|---|---|---|---|---|---|
| F3 | 0.000000 | −0.294837E−03 | 0.217886E−03 | −0.135366E−04 | 0.417117E−06 |
| F4 | 0.000000 | 0.294642E−03 | 0.155171E−04 | −0.763873E−06 | 0.907407E−08 |
| F5 | 0.000000 | −0.558147E−04 | −0.131968E−05 | 0.161370E−07 | −0.676346E−10 |
| F7 | 0.000000 | 0.203916E−04 | −0.188128E−06 | 0.229619E−08 | −0.166872E−10 |

| Face | E | F | G | H | J |
|---|---|---|---|---|---|
| F3 | −0.323209E−08 | −0.629421E−10 | −0.810392E−12 | 0.130009E−13 | 0.118379E−14 |
| F4 | 0.301720E−10 | −0.547672E−12 | | | |
| F5 | 0.123929E−12 | | | | |
| F7 | 0.540813E−13 | | | | |

| Face | $C_1$ | $\lambda_0$ | Order of diffraction | N | $R_1$[mm] | $R_N$[mm] | d[mm] |
|---|---|---|---|---|---|---|---|
| F7 | −1.6334 × 10⁻³ | 546.07 | 1 | 465 | 0.5782 | 12.4683 | 0.001 |

Example 9

| Face | Face type | Radius [mm] | Spacing to the next face [mm] | Material |
|------|-----------|-------------|-------------------------------|----------|
| 9    |           | Infinite    | 0.000000                      |          |
| F1   |           | Infinite    | 0.900000                      | NBK7_SCHOTT |
| F2   |           | Infinite    | 3.607542                      |          |
| F3   | Aspherical | −6.46993   | 3.700000                      | PSTYR    |
| F4   | Aspherical | −8.23353   | 2.100000                      |          |
| F5   | Aspherical | 12.82389   | 17.500000                     | 480R     |
| F6   |           | Infinite    | 16.500000                     | 480R     |
| F7   | Aspherical | −21.79411  | 18.300000                     |          |
| 15   |           | Infinite    |                               |          |

| Face | K | A | B | C | D |
|------|---|---|---|---|---|
| F3 | 0.000000 | −0.101416E−02 | 0.240311E−03 | −0.133574E−04 | 0.354515E−06 |
| F4 | 0.000000 | −0.127675E−03 | 0.344968E−04 | −0.917430E−06 | 0.766501E−08 |
| F5 | 0.000000 | −0.444101E−04 | −0.202281E−05 | 0.173608E−07 | −0.689916E−10 |
| F7 | 0.000000 | 0.401394E−04 | −0.245898E−06 | 0.247065E−08 | −0.168386E−10 |

| | E | F | G | H | J |
|---|---|---|---|---|---|
| F3 | −0.318319E−08 | −0.328007E−10 | 0.196918E−12 | 0.133085E−13 | −0.658499E−16 |
| F4 | 0.356150E−10 | −0.530855E−12 | | | |
| F5 | −0.110641E−13 | | | | |
| F7 | 0.437093E−13 | | | | |

The invention claimed is:

1. An optical ocular system having imaging optics, which image an image generated in an object plane so that a user can perceive it in an image plane, the imaging optics comprising:
    a first lens having negative refractive power and a deflection element, which is downstream from the first lens, having positive refractive power, which causes folding of the beam path using a single reflection,
    wherein the first lens and the object plane form a first optic group and further comprising a displacement unit, which changes the spacing between the first optic group and the deflection element to correct spherical defective vision of the user.

2. The ocular system according to claim 1, wherein the displacement unit displaces the first optic group along the optical axis of the imaging optic.

3. The ocular system according to claim 1, wherein the spacing between the first lens and the object plane is fixed in the first optic group.

4. The ocular system according to claim 1, wherein both a boundary surface of the first lens facing toward the deflection element and also a boundary surface of the deflection element facing toward the first lens are each curved convexly.

5. The ocular system according to claim 1, wherein the deflection element is implemented in one piece.

6. The ocular system according to claim 1, wherein both boundary surfaces of the first lens and entry and exit faces of the deflection element are curved aspherically, the aspheric faces being rotationally symmetric and centered on the optical axis of the imaging optic.

7. The ocular system according to claim 1, wherein a boundary surface of the deflection element facing toward the first lens is implemented as a diffractive face.

8. The ocular system according to claim 1, wherein the deflection element causes the folding of the beam path by 70°-110°.

9. The ocular system according to claim 8, wherein the deflection element causes the folding of the beam path by about 90°.

10. The ocular system according to claim 1, the ocular system further comprising an image element for generating the image in the object plane.

11. The ocular system according to claim 10, wherein the first lens and the image element are mounted in a single mounting.

12. The ocular system according to claim 10, wherein the first lens and the image element are positively connected to one another.

13. The ocular system according to claim 10, wherein the imaging optics and the image element form an eye module, which is provided twice for both eyes of the user.

14. The ocular system according to claim 13, wherein the spacing between the optic group and the deflection element is changeable in both modules independently of one another.

15. The ocular system according to claim 13, wherein the beam path in the eye module from the image plane up to an exit pupil of the imaging optic is essentially L-shaped, the eye modules being situated so that the spacing of the two optic groups is less than the spacing of the two deflection elements.

16. The ocular system according to claim 13, wherein the beam path in the eye module from the image plane up to an exit pupil of the imaging optic is essentially L-shaped, the eye modules being situated so that the spacing of the two optic groups is greater than the spacing of the two deflection elements.

17. A display device having an optical ocular system according to claim 1 and a mounting module to be worn on the head, in which the imaging optics is fastened on the mounting module, wherein the image imaged using the imaging optic is perceptible by a user wearing the display device.

18. A display device according to claim 17, wherein the image element is fastened on the mounting module.

* * * * *

UNITED STATES PATENT AND TRADEMARK OFFICE
CERTIFICATE OF CORRECTION

| | | |
|---|---|---|
| PATENT NO. | : 7,889,429 B2 | Page 1 of 1 |
| APPLICATION NO. | : 12/593227 | |
| DATED | : February 15, 2011 | |
| INVENTOR(S) | : Bertram Achtner | |

It is certified that error appears in the above-identified patent and that said Letters Patent is hereby corrected as shown below:

Title Page; item (30);

- Foreign Application Priority Data should list ".9" after "10 2007 015 278"; and

- Col. 11-14. The PTO printed line numbers 35-65 between Col. 11 and Col. 12 and between Col. 13 and Col. 14. The presence of these digits obscures some text in the tables and also, in some positions, gives the impression that the line numbers are data belonging to the tables.

Signed and Sealed this
Fifth Day of July, 2011

David J. Kappos
*Director of the United States Patent and Trademark Office*